US009644707B2

(12) United States Patent
Meyer

(10) Patent No.: US 9,644,707 B2
(45) Date of Patent: May 9, 2017

(54) UNIVERSAL GEAR ASSEMBLY FOR AUTOMATIC POOL COVERS

(71) Applicant: Latham Pool Products, Inc., Latham, NY (US)

(72) Inventor: Jarrod Meyer, Sandy, UT (US)

(73) Assignee: Latham Pool Products, Inc., Latham, NY (US)

( * ) Notice: Subject to any disclaimer, the term of this patent is extended or adjusted under 35 U.S.C. 154(b) by 39 days.

(21) Appl. No.: 14/539,974

(22) Filed: Nov. 12, 2014

(65) Prior Publication Data

US 2015/0122080 A1  May 7, 2015

Related U.S. Application Data

(63) Continuation-in-part of application No. 14/479,221, filed on Sep. 5, 2014, now abandoned, which is a continuation of application No. 13/966,161, filed on Aug. 13, 2013.

(60) Provisional application No. 61/682,739, filed on Aug. 13, 2012.

(51) Int. Cl.

| F16D 11/04 | (2006.01) |
| F16D 11/14 | (2006.01) |
| E04H 4/00  | (2006.01) |
| F16H 1/22  | (2006.01) |
| E04H 4/10  | (2006.01) |

(52) U.S. Cl.
CPC ............. *F16H 1/22* (2013.01); *E04H 4/101* (2013.01); *Y10T 74/19112* (2015.01)

(58) Field of Classification Search
CPC ..................... F16D 11/14; F16D 2011/008

USPC ............ 74/665 F, 352, 355; 192/108; 4/502
See application file for complete search history.

(56) References Cited

U.S. PATENT DOCUMENTS

| 1,036,560 A | * | 8/1912 | Campbell ............... F16D 11/10 |
| | | | 192/108 |
| 1,907,619 A | * | 5/1933 | Soden-Fraunhofen . F16D 11/10 |
| | | | 192/108 |
| 2,268,412 A | * | 12/1941 | McCombs ............ B25D 11/102 |
| | | | 173/93.6 |
| 2,608,075 A | * | 8/1952 | Palmer ................... D04B 15/94 |
| | | | 192/108 |
| 3,780,840 A | * | 12/1973 | Thomas .................. F16D 11/10 |
| | | | 192/108 |
| 3,986,409 A | * | 10/1976 | Tripp ....................... G05G 1/02 |
| | | | 188/83 |
| 5,524,302 A | * | 6/1996 | Ragsdale ................. E04H 4/101 |
| | | | 242/388.8 |
| 6,082,515 A | * | 7/2000 | Oono ...................... F16D 1/076 |
| | | | 192/108 |

(Continued)

*Primary Examiner* — Ha D Ho
(74) *Attorney, Agent, or Firm* — Kilpatrick Townsend & Stockton LLP

(57) ABSTRACT

A double dog gear assembly having a hollow cylindrical body member extending along a longitudinal axis between a first gear face and a second gear face. A first set of elongated pin slots are formed in the hollow cylindrical body member and spiral in a first direction. A second set of elongated pin slots formed are also formed in the hollow cylindrical body member and spiral in a second direction, which is different than the first direction. A locking pin selectively engages one of the first and second set of elongated pin slots such that the gear assembly can be used in either a left or right installation.

18 Claims, 13 Drawing Sheets

(56) References Cited

U.S. PATENT DOCUMENTS

| | | | | |
|---|---|---|---|---|
| 6,095,303 A * | 8/2000 | Gutmann | ................ | F16D 11/10 |
| | | | | 192/108 |
| 6,701,796 B2 * | 3/2004 | Blanchard | ............... | F16H 55/06 |
| | | | | 192/108 |
| 7,506,563 B2 * | 3/2009 | Douglas | .................. | F16D 1/101 |
| | | | | 188/69 |
| 7,849,991 B2 * | 12/2010 | Harrison | ................ | F16D 11/14 |
| | | | | 192/108 |

* cited by examiner

UNIVERSAL GEAR ASSEMBLY FOR AUTOMATIC POOL COVERS

CROSS-REFERENCE TO RELATED APPLICATIONS

This application is a continuation-in-part of U.S. application Ser. No. 14/479,221, filed Sep. 9, 2014, which is a continuation of U.S. application Ser. No. 13/966,161, filed Aug. 13, 2013 which claims the benefit of U.S. Provisional Application No. 61/682,739, filed Aug. 13, 2012, which are hereby incorporated by reference herein in their entirety, including but not limited to those portions that specifically appear hereinafter. This incorporation by reference being made with the following exception: In the event that any portion of the above-referenced provisional application is inconsistent with this application, this application supercedes said above-referenced provisional

STATEMENT REGARDING FEDERALLY SPONSORED RESEARCH OR DEVELOPMENT

Not Applicable.

BACKGROUND

1. The Field of the Present Disclosure

The present disclosure relates generally to motorized pool cover systems for use with swimming pools, and more particularly, but not necessarily entirely, to motorized pool cover systems with gear assemblies for selectively transferring power from an input shaft to one of two output shafts.

2. Description of Related Art

A dog gear is a sliding selector mechanism that is coupled to an input shaft. A dog gear is typically splined to an output shaft, meaning that the dog gear has teeth that fit into slots on the output shaft, forcing the output shaft to rotate with it. The advantage to a dog gear is that its teeth allow the gear to move back and forth with respect to the output shaft to thereby selectively engage and disengage the output shaft. A double dog gear refers to a gear that is able to selectively engage two output shafts. A double dog gear is typically symmetric: it slides between two gears and has a synchromesh and teeth on each side in order to lock either gear.

In the past, double dog gear mechanisms have been employed in automatic pool cover installations. In particular, double dog gear mechanisms have been utilized to open and close pool covers by selectively coupling a motor shaft to one of cord spool shaft and a cover drum shaft, the spool comprising a take-up real for a cable utilized to pull the cover closed and the cover drum utilized to roll-up the pool cover. These previously available double dog gear mechanisms included two interlocking teeth, with each tooth having a moderate slope on one edge and a much steeper slope on the other edge. As such, these double dog gear mechanisms operated similar to ratchets, meaning that the teeth would only engage in one direction and would free spin in the other direction.

One drawback to previously available double dog gears is their relatively high failure rate. In particular, when the motor turns and the drive gear begins to move it has to rotate between 90 and 180 degrees before it becomes fully engaged with the pulley system that slides the cover on and off. This causes the drive gear to engage the pulley at a high rate of speed and results in galling (a type of wear caused by friction between two interlocking surfaces that is common when metals slide while touching other metals), grinding, and excessive wear. This condition causes damage such as: broken gears, prematurely worn or razor sharp gear teeth edges, broken ropes, the cover coming out of the track, and even the loosening of the mounting screws as a result of flexing when the cover is pushed more to one side of the pool. Sometimes this can even cause the system to stall, which in turn, locks the drive components and prevents the cover from opening and closing potentially leading to an unsafe condition.

Another drawback to previously available double dog gear mechanisms was the inability of the gear mechanisms to be installed on either side of the pool cover. In particular, in pool installations, the drive motor for the pool cover may be installed on either side of the pool cover depending, for example, on the location of the power supply. Previously available double dog gear mechanisms were side specific, meaning that they could not be utilized for both left and right side installations. Thus, pool installers would have to specifically order double dog gear mechanisms dependent upon the side of the pool cover that the motor was installed. This would often times lead to confusion if the wrong part was accidently ordered or delivered. Thus, it would be an advantage over the prior art to provide a double dog gear that could be utilized for either a left or right motor installation.

The prior art is thus characterized by several disadvantages that are addressed by the present disclosure. The present disclosure minimizes, and in some aspects eliminates, the above-mentioned failures, and other problems, by utilizing the methods and structural features described herein. The features and advantages of the present disclosure will be set forth in the description which follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1A:
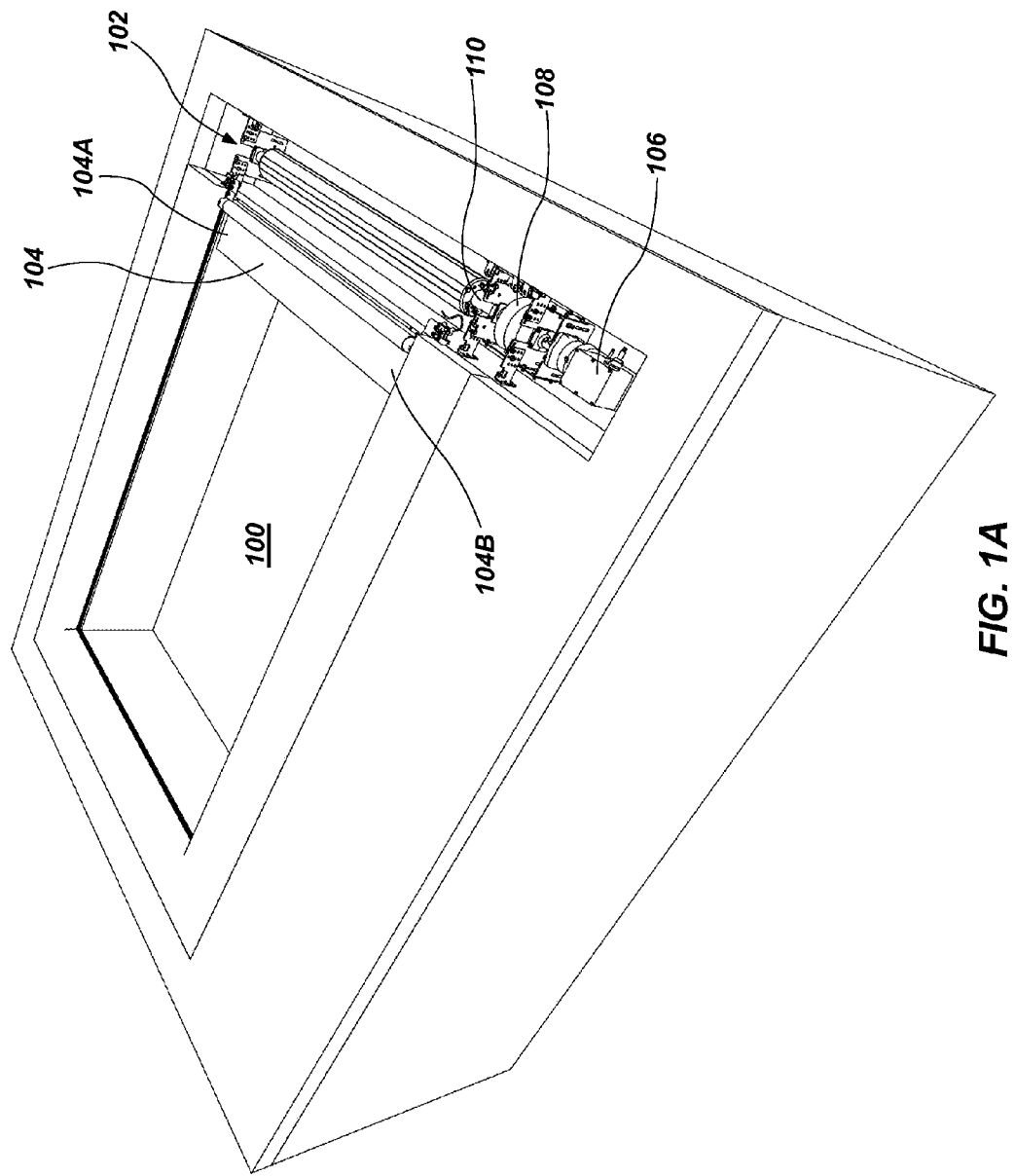
FIG. 1A depicts an automatic pool cover system installed on a swimming pool according to an embodiment of the present disclosure.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

In describing and claiming the present disclosure, the following terminology will be used in accordance with the definitions set out below. It must be noted that, as used in this specification and the appended claims, the singular forms "a," "an," and "the" include plural referents unless the context clearly dictates otherwise. As used herein, the terms "comprising," "including," "containing," "characterized by," and grammatical equivalents thereof are inclusive or open-ended terms that do not exclude additional, unrecited elements or method steps.

In an embodiment, the present disclosure may provide a double dog gear assembly that has a plurality of square teeth. The gear assembly may only require a quarter turn of the motor, 45 degrees, to accomplish full engagement. This may result in the drive gear engaging with a cord pulley mechanism at a much lower speed and better synchronization when they lock together. This may further drastically decrease the inherent effects of galling, grinding, and excessive wear present in the prior art devices. This goes a long way to prevent system failure, and in turn, eliminate costly service calls and pool down time.

Referring now to FIG. 1A, there is depicted a swimming pool 100 pursuant to an embodiment of the present disclosure. The pool 100 may include an automatic pool cover system 102. The pool cover system 102 may include a pool cover 104 that closes over the pool 100. Edges 104A and 104B of the pool cover 104 may be guided by tracks disposed in the sidewalls of the pool 100.

In an embodiment, the system 102 may include a reversible motor 106 that may be utilized to open and close the pool cover 104. The motor 106 may be controlled by a control unit operated by a user as is known to those skilled in the art. The motor 106 may be operable to selectively turn either one of cord take-up spools 108 or a cover drum 110.

In particular, to close the cover 104, the motor 106 turns the spools 108 when the user selects the "close" command at the control unit such that the spools 108 wind the cords that are attached to edges 104A and 104B of the pool cover 104. The cords pull the cover 104 closed using a pulley system as is known to those of ordinary skill.

To open the cover 104, the motor 106 may turn the drum 110 when a user selects the "open" command at the control unit. The pool cover 104 winds up on the drum 110 as it turns to thereby open or uncover the pool cover 104. While the cover 104 is being opened, the spools 108 may be in free spool to allow the cords to unwind. In an embodiment, the motor 106 may be an electric or hydraulic motor.

Figure 1B:
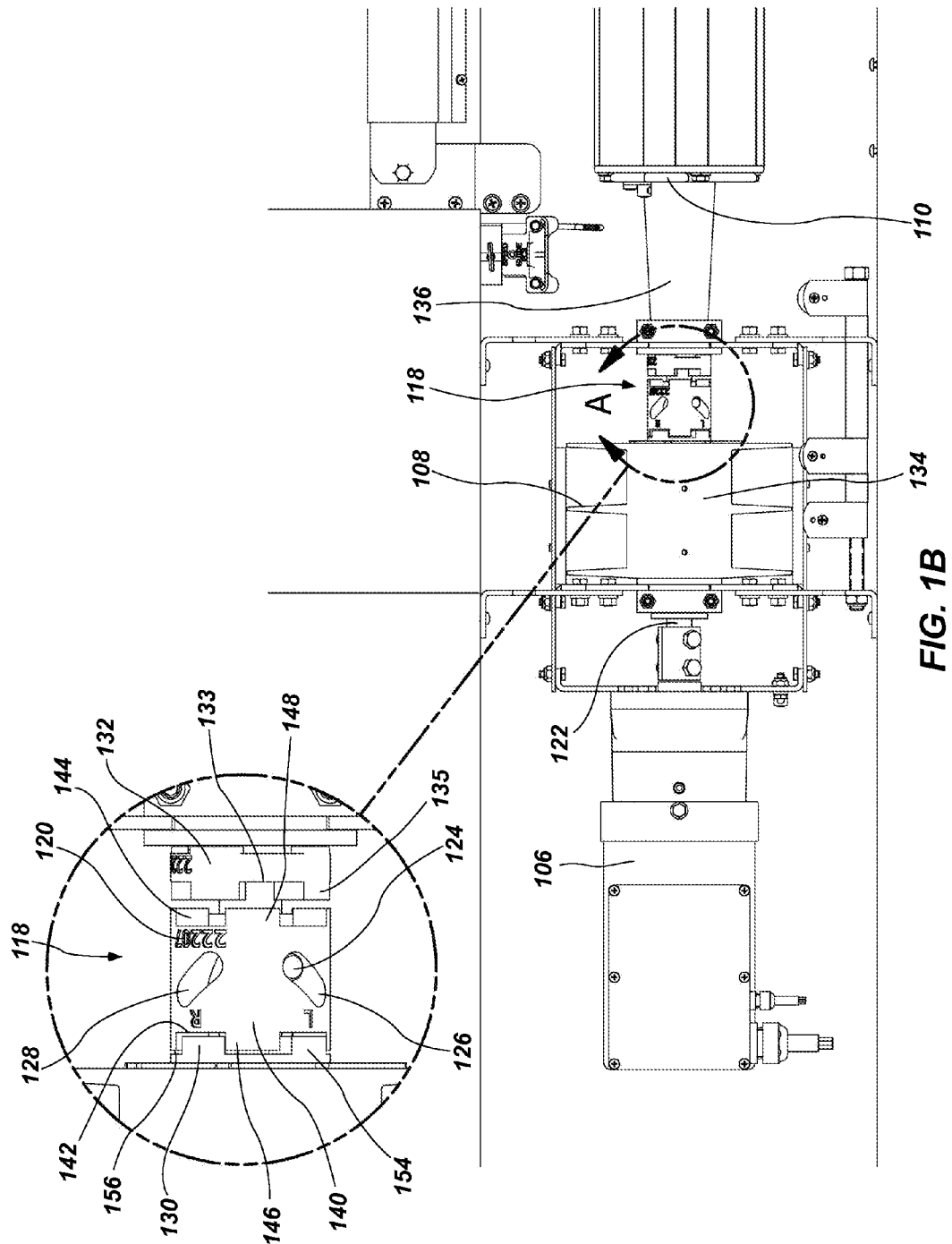
FIG. 1B is a partial, fragmentary view of a motor assembly for operating the pool cover shown in FIG. 1 between an open and a closed position.

Referring now to FIG. 1B, there is depicted a close-up view of the motor-side of the installation. In particular, the motor 106 may be connected to a drive shaft 122. A double dog gear assembly 118 may be coupled to the drive shaft 122 in a manner that will be explained herein. The gear assembly 118 may include a control gear 120.

In an embodiment, the control gear 120 is slidably mounted on the drive shaft 122. That is, the control gear 120 may slide in the axial direction along the length of the shaft 122, in either direction, responsive to the direction rotation of the drive shaft 122. That is, the direction of rotation of the drive shaft 122 may determine which side of the control gear 120 engages one of a first output shaft 134 and a second output shaft 136. In this regard, the first output shaft 134 may be coupled to the spools 108 and the second output shaft 136 may be coupled to the drum 110. In this manner, the same motor 106 may rotate either the spools 108 or the drum 110 dependent on the direction of rotation of the drive shaft 122.

The control gear 120 may comprise a first set of elongated pin slots 126 and a second set of elongated pin slots 128. In an embodiment, the first set of elongated pin slots 126 spiral in a first direction and the second set of elongate pin slots 126 spiral in a second direction. In an embodiment, the first direction and the second direction may be different from each other.

The first set of elongated pin slots 126 and the second set of elongated pin slots 128 may be configured and adapted for receiving a pin 124. The first set of elongated pin slots 126 may be selected for left installations, i.e., when the motor 106 is installed on the left side of the pool cover 104. The second set of elongated pin slots 128 may be selected for right installations, i.e., when the motor 106 is installed on the right side of the pool cover 104.

In an embodiment, the first set of elongated pin slots 126 and the second set of elongated pin slots 128 each consists of a single slot. In an embodiment, the first set of elongated pin slots 126 and the second set of elongated pin slots 128 each consists of two slots disposed on opposite sides of the control gear 120, which are aligned such that the pin 124 may be installed through both slots.

The pin 124 may selectively engage one of the first set of elongated pin slots 126 and the second set of elongated pin slots 128 as selected by the installer dependent on which side of the pool 100 the motor 106 is installed. Further, the pin 124 may engage a bore in the drive shaft 122.

The control gear 120 may comprise a hollow cylindrical body member 140 extending along a longitudinal axis between a first gear face 142 and a second gear face 144. Extending from the first gear face 142 may be a plurality of teeth 146. Extending from the second gear face 144 may be a plurality of teeth 148.

The gear assembly 118 may further include a first end gear 130 and a second end gear 132. The first end gear 130 may include a first gear face 156 having a plurality of teeth 154 extending therefrom. The teeth 154 may be configured and adapted to intermesh with teeth 146. The second end gear 132 may include a first gear face 133 having a plurality of teeth 135 extending therefrom. The teeth 135 may be configured and adapted to intermesh with teeth 148.

The first end gear 130 may be coupled to an output shaft 134, which is in turn coupled to the spool 108. The second end gear 132 may be coupled to an output shaft 136, which is in turn coupled to the drum 110. The first end gear 130 may be coupled to the output shaft 134 by fasteners, such as bolts. The second end gear 132 may be coupled to the output shaft 136 by fasteners, such as bolts. As further shown in FIG. 1B, depending on the direction of rotation of the drive shaft 122, the control gear 120 will slide axially along the drive shaft 122 to either engage the first end gear 130 or the second end gear 132.

Figure 1C:
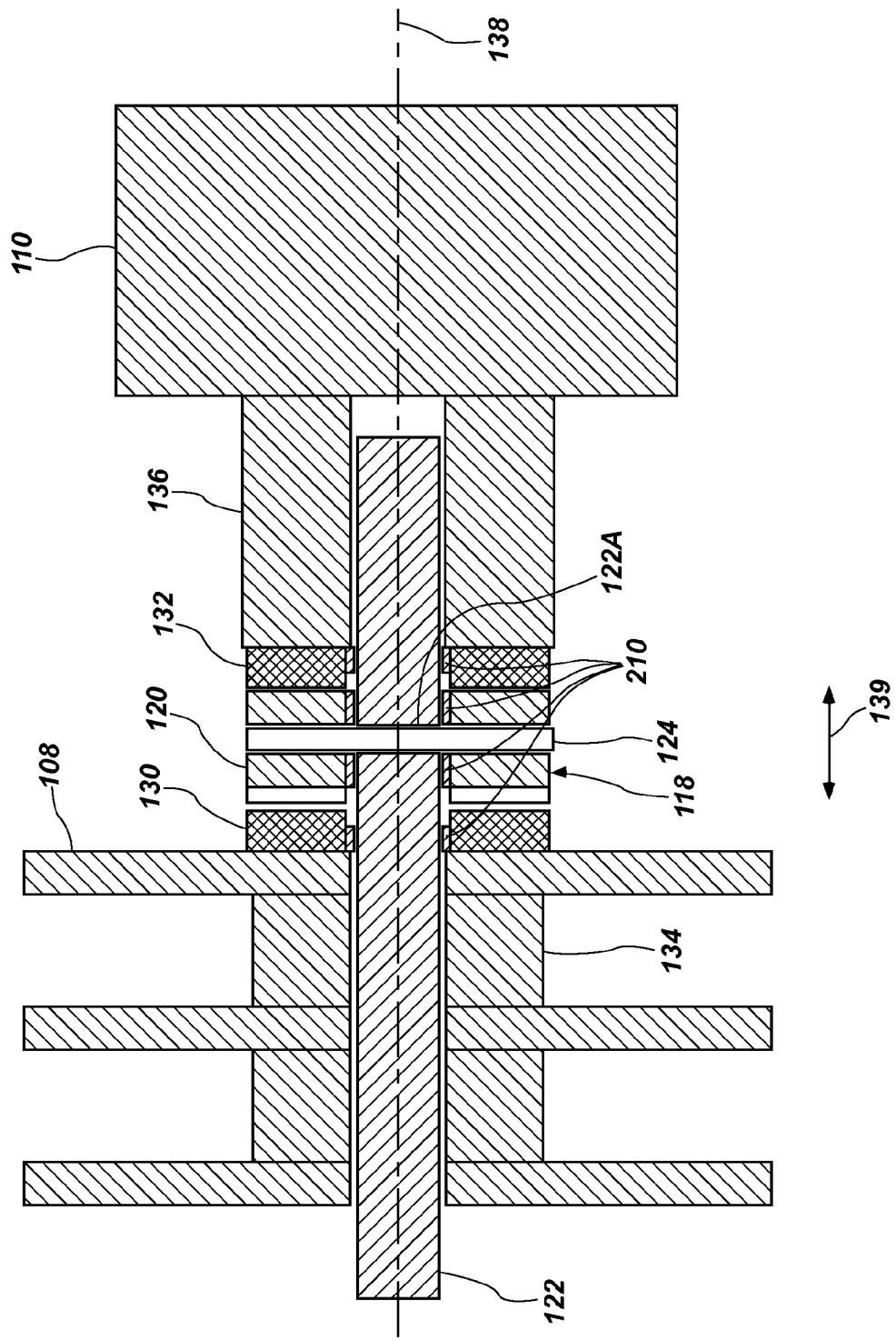
FIG. 1C is a cross-sectional view of a gear assembly according to an embodiment of the present disclosure.

Referring now to FIG. 1C, there is depicted a cross-sectional view of the gear assembly 118, where like reference numerals depict like components. As can be observed, the drive shaft 122 may include a pin receiving hole 122A for receiving the pin 124. The drive shaft 122 and the output shafts 134 and 136 may be coaxial along a longitudinal axis 138. The control gear 120 may slide axially as shown by the double arrows marked with the reference numeral 139 dependent on the direction of rotation of the drive shaft 122.

Figure 2:
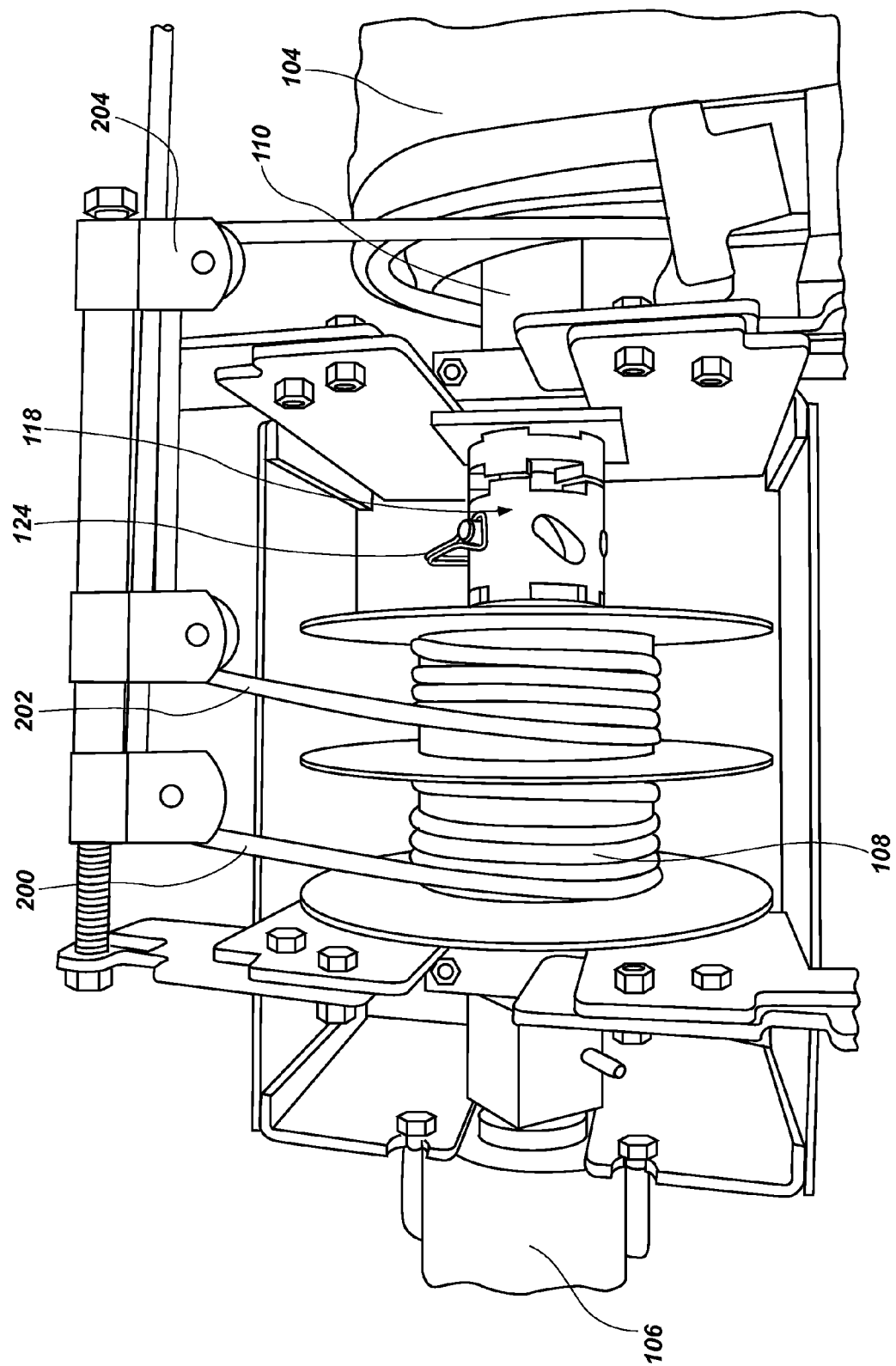
FIG. 2 is a partial, fragmentary view of a motor assembly for operating the pool cover shown in FIG. 1 showing an associated cable pulley system and pool cover.

Referring now to FIG. 2, where like reference numerals depict like components, cords 200 and 202 may be directed by a pulley system 204 onto the spool 108. The cords 200 and 202 may be attached to a leading edge of the pool cover 104. The motor 106 is operable to wind up the cords 200 and 202 onto the spool 108 while closing the pool cover 102. Likewise, the pool cover 104 may be rolled up onto the cover drum 110 by the motor 106. Whether the spool 108 or the drum 110 is turned by the motor 106 is dependent on the direction of rotation of the motor 106.

Figure 3:
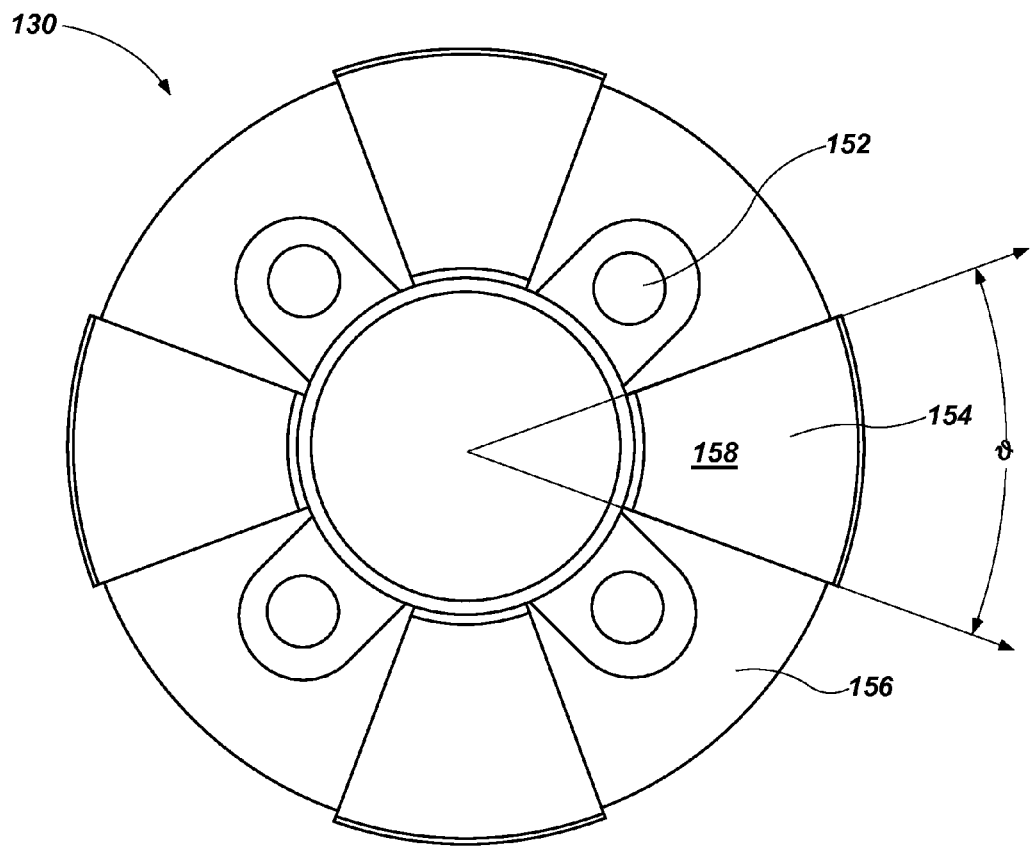
FIG. 3 is an view of an gear face of an end gear according to an embodiment of the present disclosure.
Figure 4:
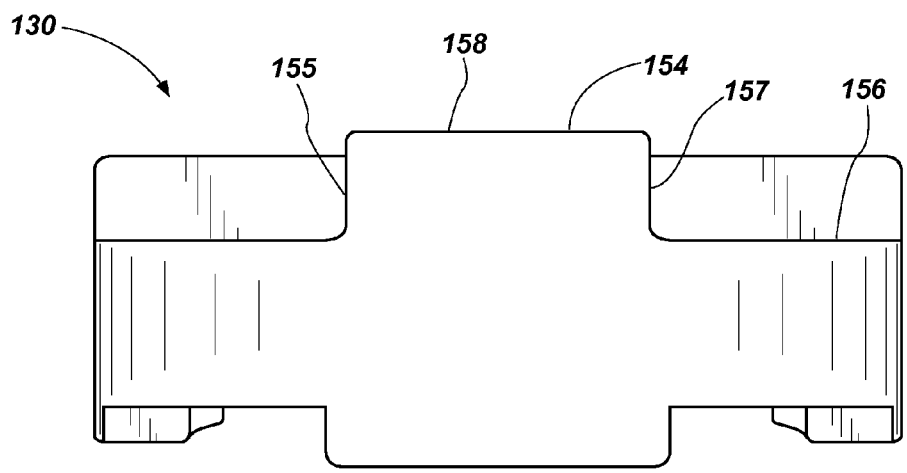
FIG. 4 is a side view of the gear face of the end gear shown in FIG. 3.
Figure 5:
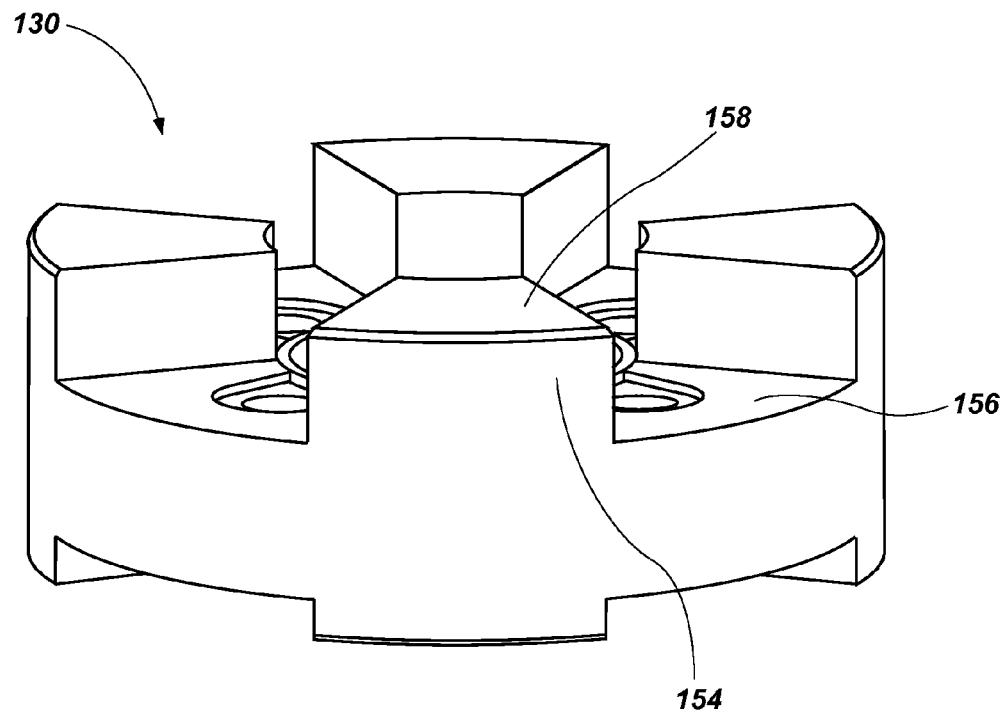
FIG. 5 is a partially elevated view of the end gear shown in FIGS. 3 and 4.

Referring now to FIGS. 3-5, there is depicted the first end gear 130 according to an embodiment of the present disclosure. It will be appreciated that because the second end gear 132 may have a similar configuration to the first end gear 130, it will not be separately discussed herein. As mentioned, the first end gear 130 may have a first gear face 156. Extending from the first gear face 156 may be the plurality of teeth 154. Each of the plurality of teeth 154 may include a top surface 158.

In an embodiment, the top surface 158 of each of the teeth 154 may be wedge shaped and planar. The wedge of the top surface 158 may define an angle 2 from the center of the end gear 130. In an embodiment, the angle 2 is between 25 and 50 degrees. In an embodiment, the angle 2 is between 40 and degrees. In an embodiment, the angle 2 is about 35 degrees.

As perhaps best seen in FIG. 4, each of the teeth 154 may comprise a rectangular cross-section and the sidewalls 155 and 157 of the teeth 154 may be perpendicular to first gear face 156 and the top surface 158. The first end gear 130 may further include bores 152 for receiving fasteners for securing the gear 130 to an output shaft.

Figure 8:
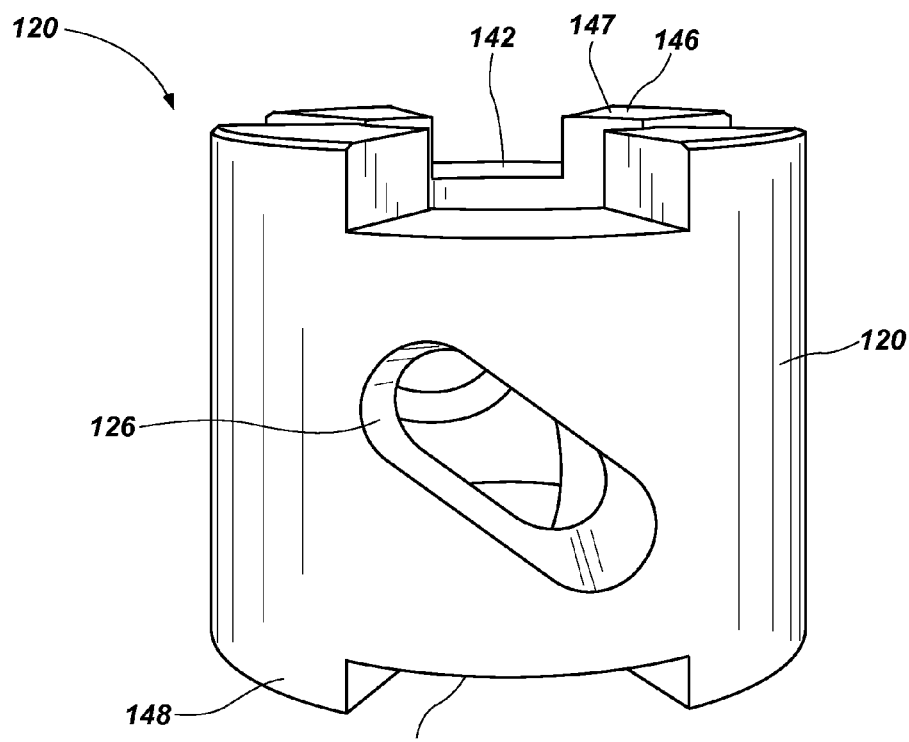
FIG. 8 is still another side view of the gear shown in FIGS. 6 and 7.

Referring now to FIGS. 6-9, there is depicted the control gear 120 of the double dog gear assembly 118. Each of the teeth 146 extending from the first gear face 142 may include a rectangular cross section. As perhaps best seen in FIG. 7, each of the teeth 146 may include a top surface 147 and a first sidewall 149 and a second sidewall 151. The first sidewall 149 and the second sidewall 151 may be perpendicular to the first gear face 142 and the top surface 147. As seen in FIG. 8, the top surface 147 of each of the teeth 146 may be wedge shaped and planar. The teeth 148 extending from the second gear face 144 may also have a rectangular cross section and have a wedge-shaped and planar top surface. In this regard, each of the wedge-shaped top surfaces 147 of the teeth 146 and 148 may define an angle 2 having the same dimensions as described above in reference to FIG. 3.

Figure 6:
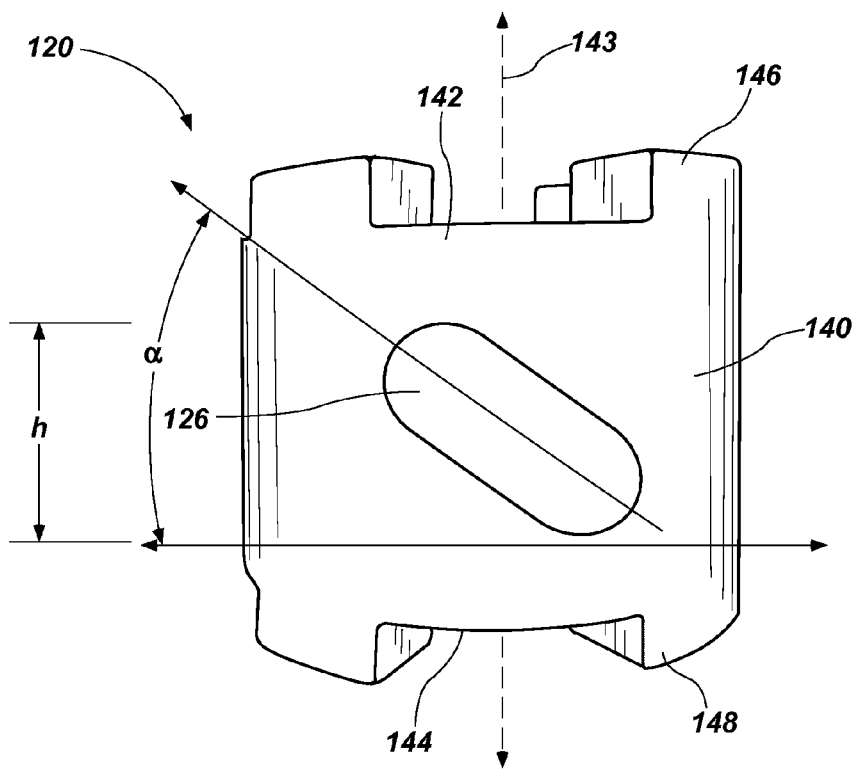
FIG. 6 is a side view of a middle gear according to an embodiment of the present disclosure.
Figure 7:
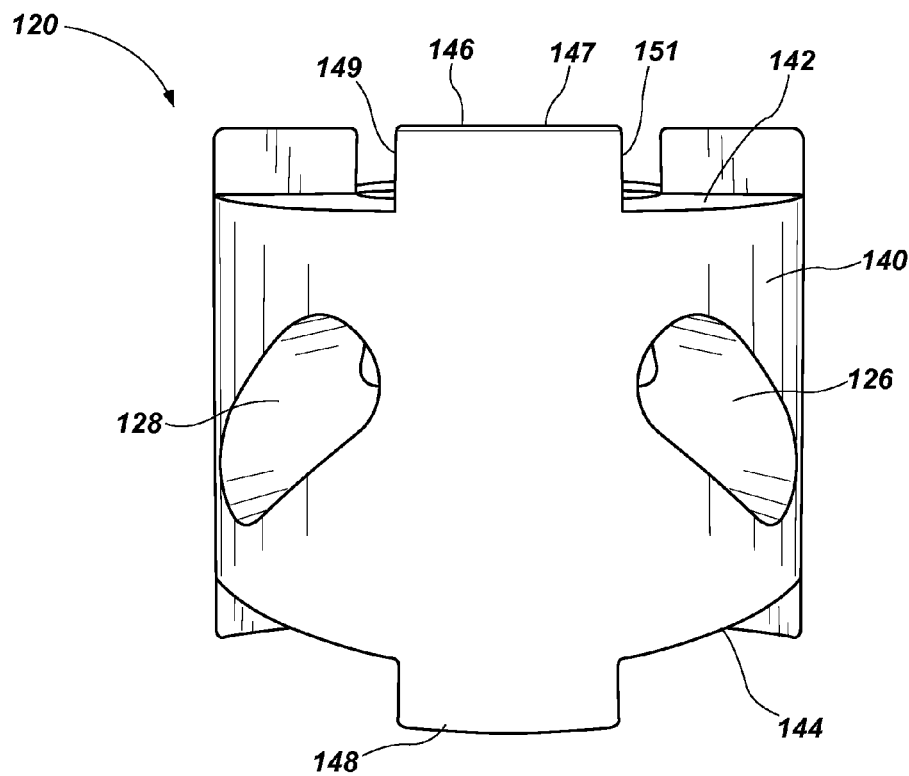
FIG. 7 is another side view of the middle gear shown in FIG. 6.

Referring now to FIG. 6, the body member 140 of the control gear 120 may extend along an axis 143. As mentioned, the body member 140 may include the first set of elongated pin slots 126. The first set of elongated pin slots 126 may form an angle " with a plane perpendicular to the axis 143. In an embodiment, the angle " may be about 40 degrees. In an embodiment, the angle " is between about 35 degrees and 45 degrees. In an embodiment, an axial length h of the first set of elongated pin slots 126 is about 0.75 to 0.95 inches. In an embodiment, the axial length h of the first set of elongated pin slots 126 is about 0.83 inches.

Figure 9:
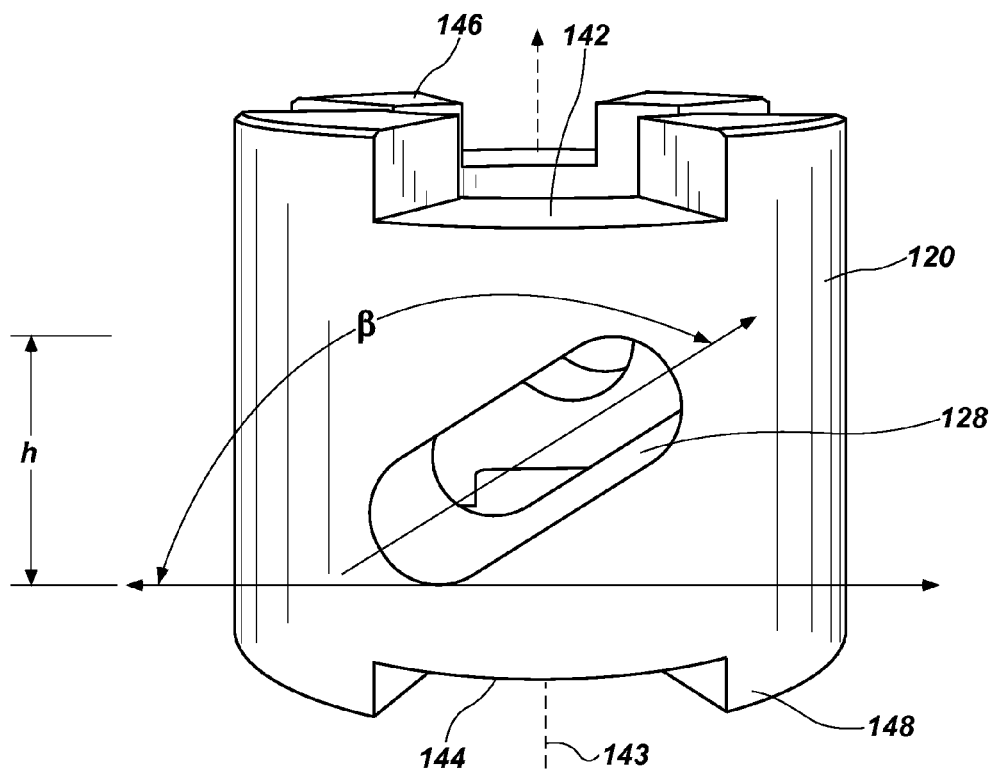
FIG. 9 is still another side view of the middle gear shown in FIGS. 6-8.

Referring now to FIG. 9, the body member 140 of the control gear 120 may extend along the axis 143. As mentioned, the body member 140 may include the second set of elongated pin slots 128. The second set of elongated pin slots 128 may form an angle $ with a plane perpendicular to the axis 143. In an embodiment, the angle " may be about 140 degrees. In an embodiment, the angle " is between about 135 degrees and 145 degrees. In an embodiment, an axial length h of the first set of elongated pin slots 128 is about 0.75 to 0.95 inches. In an embodiment, the axial length h of the first set of elongated pin slots 128 is about 0.83 inches. As used herein, the term "about" means within ten percent of the stated value.

Figure 10:
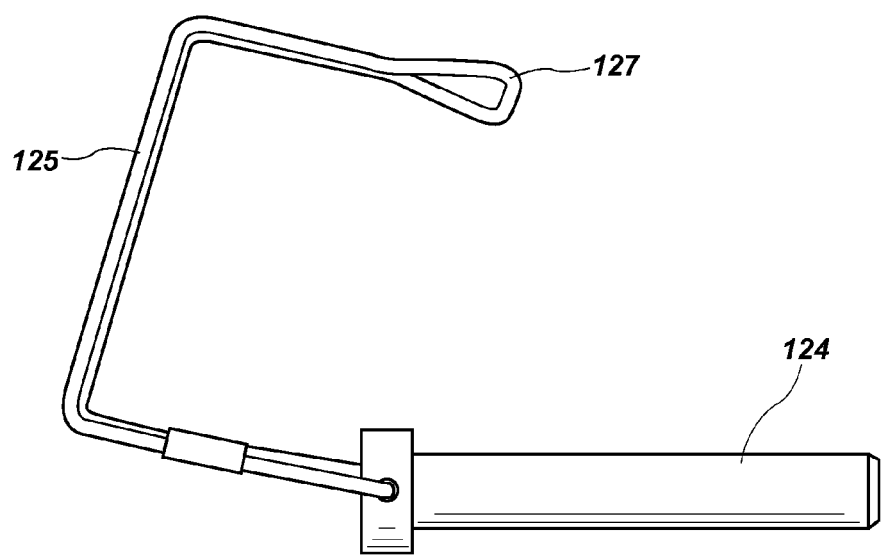
FIG. 10 depicts a locking pin according to an embodiment of the present disclosure.

Referring now to FIG. 10, there is depicted a pin 124 pursuant to an embodiment of the present disclosure. The pin 124 may include a pivoting locking arm 125 having a catch 127 for engaging a distal end of the pin 124.

Figure 11:
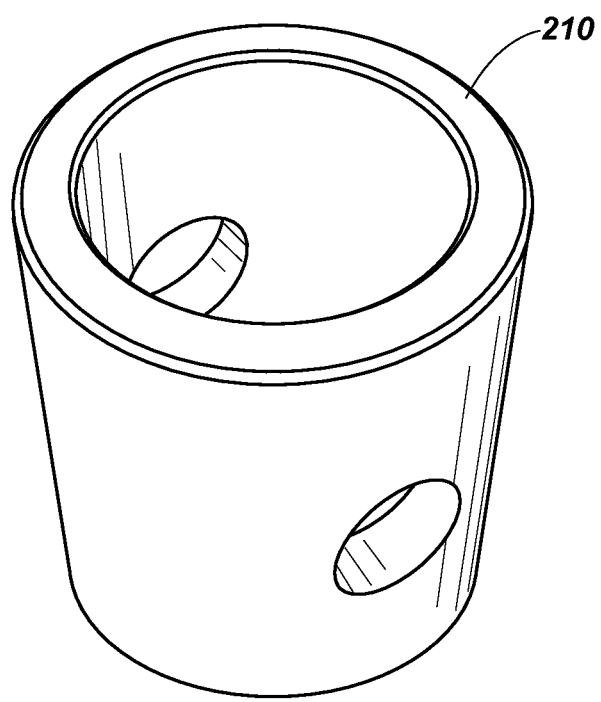
FIG. 11 depicts a bushing according to an embodiment of the present disclosure.

Referring now to FIGS. 10 and 11, there is depicted a bushing 210 pursuant to an embodiment of the present disclosure. In an embodiment, the bushing 210 is formed of brass and may be interposed between the components of the gear assembly 118 and the drive shaft 122. The bushing 210 may provide increased life for the components of the gear assembly 118.

Figure 12:
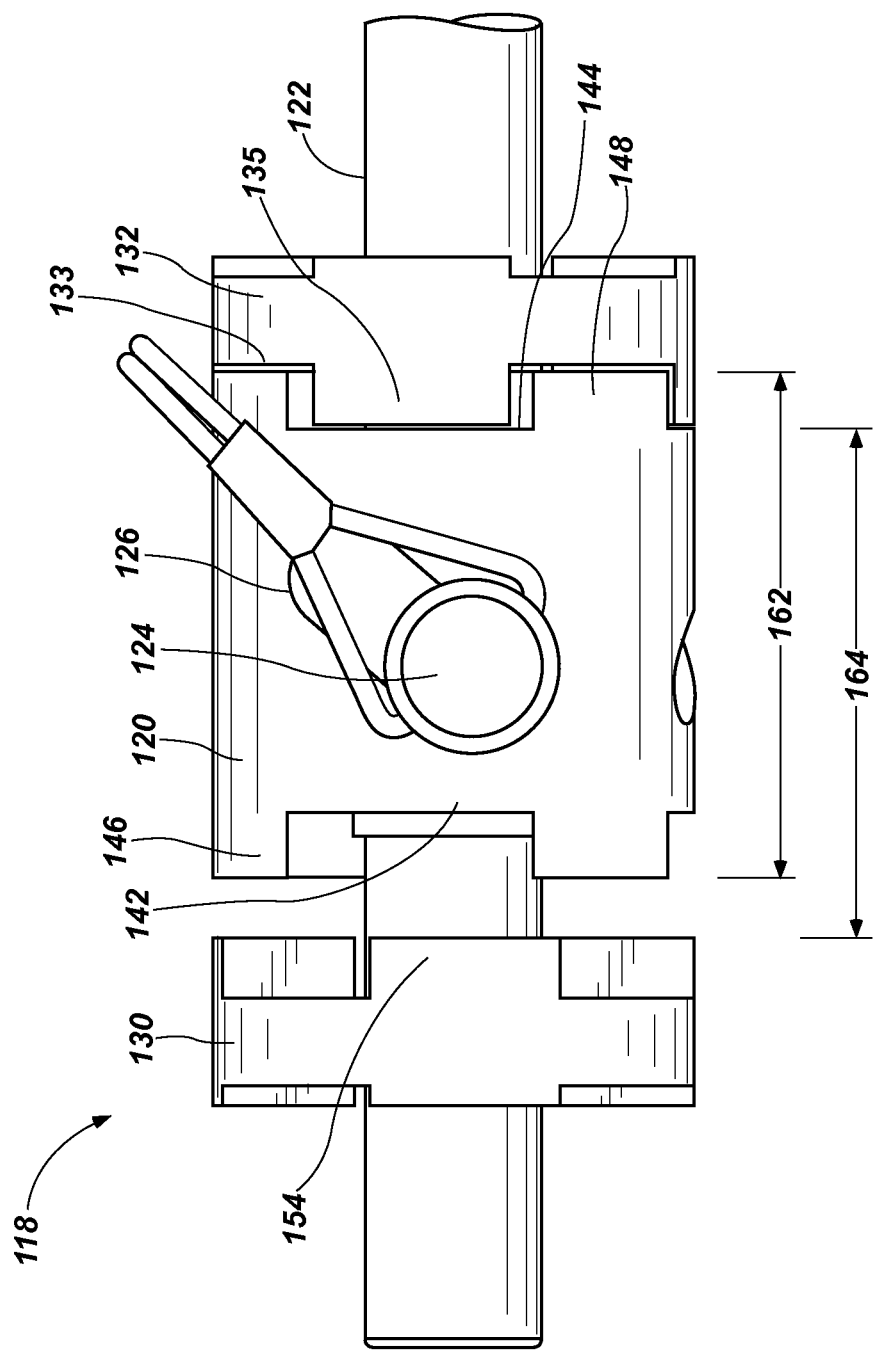
FIG. 12 depicts a gear assembly according to an embodiment of the present disclosure with the middle gear engaging the right end gear and the locking pin installed in a first set of elongated slots.
Figure 13:
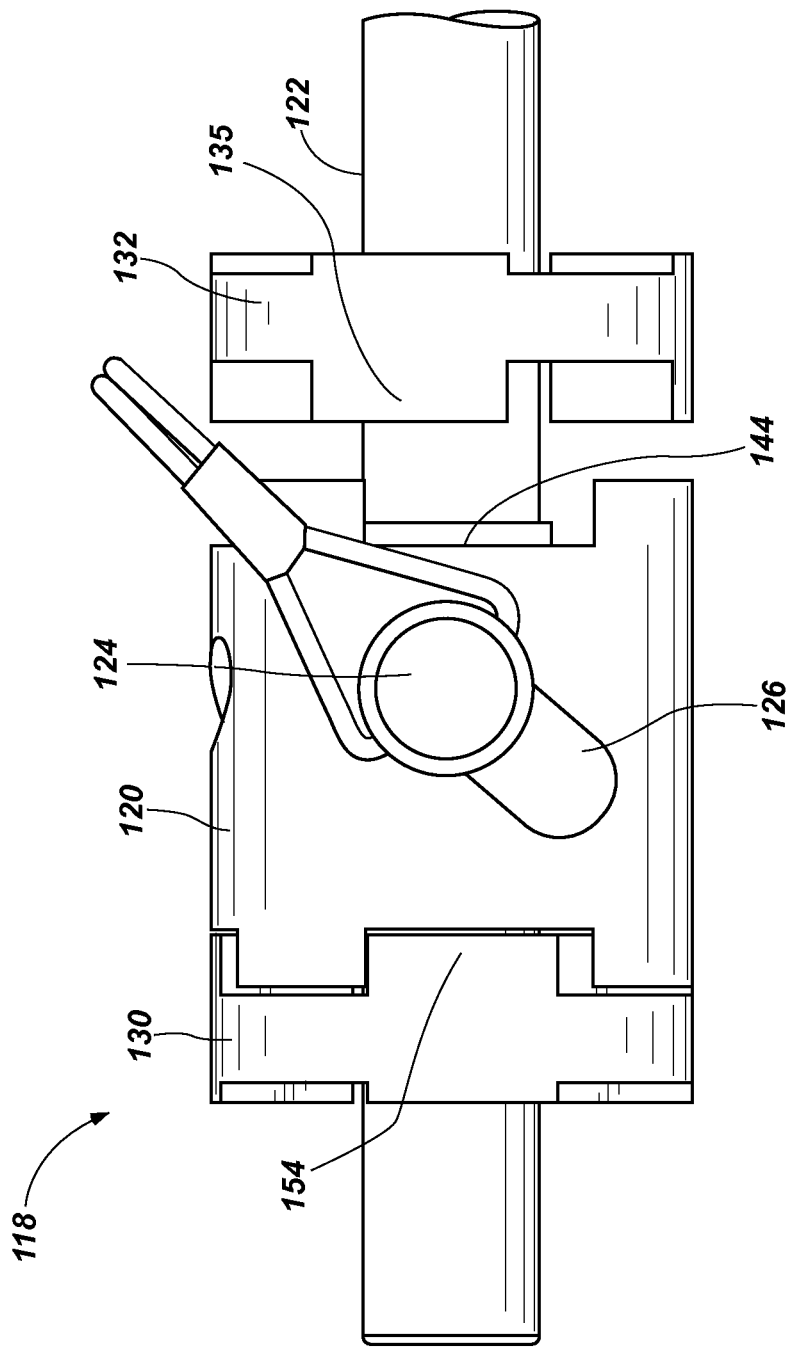
FIG. 13 depicts the gear assembly shown in FIG. 12 with the middle gear engaging the left end gear.
Figure 14:
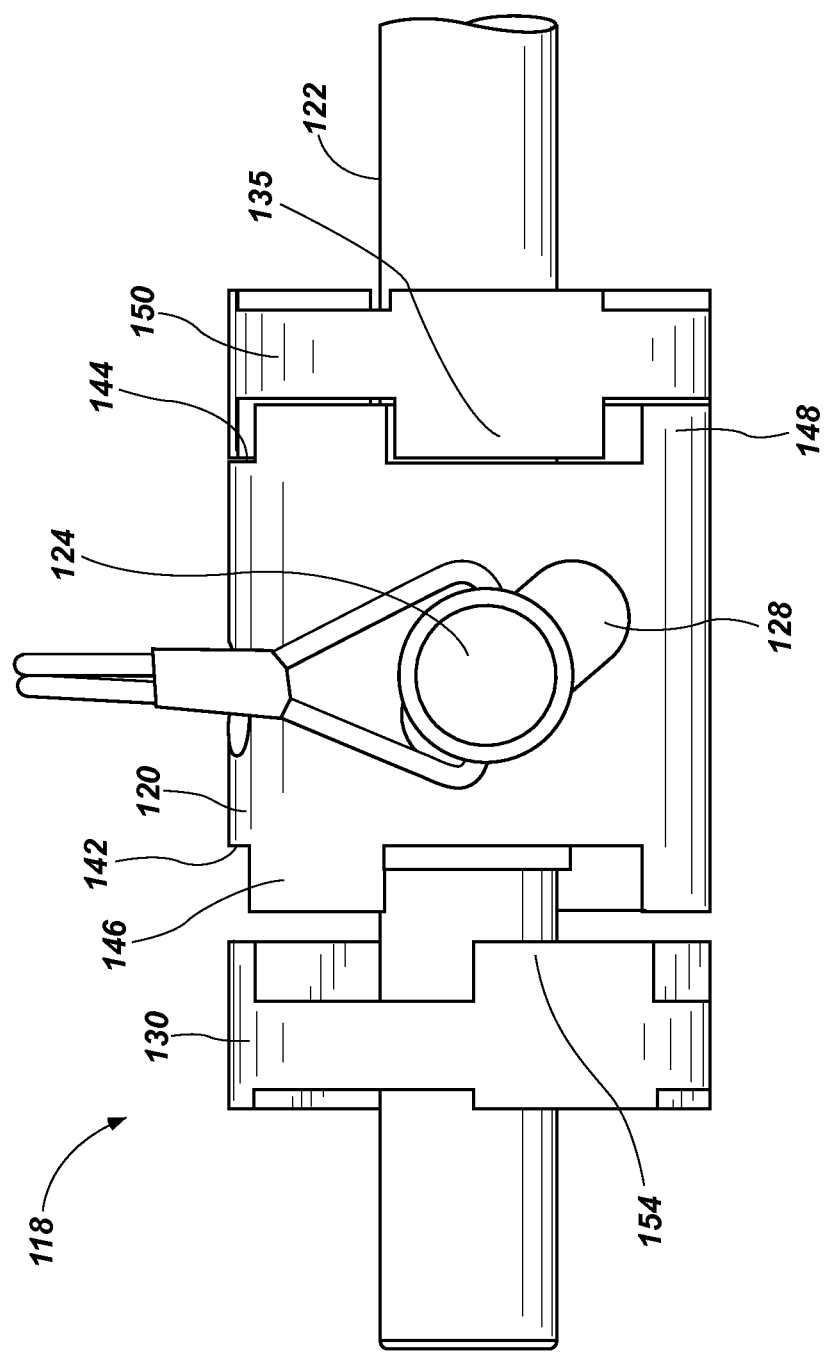
FIG. 14 depicts a gear assembly according to an embodiment of the present disclosure with the middle gear engaging the right end gear and the locking pin installed in a second set of elongated slots.

Referring now to FIGS. 12-15, there is depicted the double dog gear assembly 118, where like reference numerals depict like components. In FIGS. 12 and 13, the pin 124 is installed into slots 126 while in FIGS. 14 and 15 the pin is installed into slots 128. Again, a user selects the proper one of the slots 126 and 128 based upon whether the gear assembly 118 is installed on the left side or right side of the pool cover. In this regard, the gear assembly 118 may be considered a "universal" gear because it may be used for both left side and right side pool installations.

Figure 15:
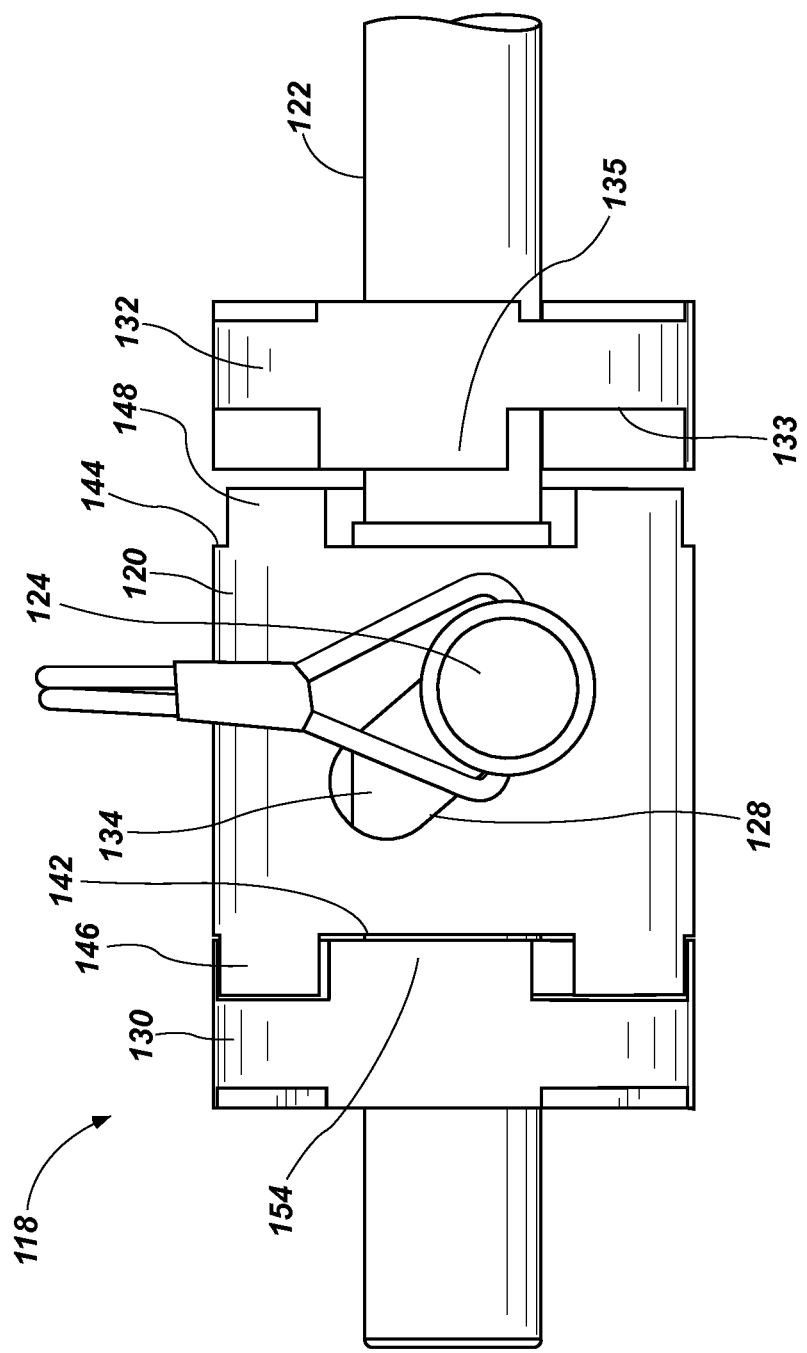
FIG. 15 depicts the gear assembly shown in FIG. 14 with the middle gear engaging the left end gear.

As seen in FIGS. 12 and 13, the control gear 120 may slide axially along the drive shaft 122 depending on the direction of rotation of the drive shaft 122. Likewise, as seen in FIGS. 15 and 16, the control gear 120 may slide axially along the drive shaft 122 depending on the direction of rotation of the drive shaft 122. In an embodiment, the control gear 120 may slide about 0.375 of an inch along the drive shaft (this length is sometimes referred to as the "throw" length). In an embodiment, the gear 120 may slide between about 0.36 and 0.39 of an inch on the drive shaft 122.

In an embodiment, an axial length 162 of the control gear 120 (measured between the ends of the teeth 146 and 148) is greater than a length 164 between the ends of the teeth 154 and 135 of the two gears 130 and 132. In this manner, the control gear 120 may always be engaged to one of the gears 130 and 132 and may briefly be simultaneously engaged with both gears 130 and 132. Further, the gear assembly 118 may only require a quarter turn of the drive shaft 122, 45 degrees, to accomplish full engagement. In an embodiment, the gear faces of each of the components of the gear assembly 118 may have any number of teeth, including one, two, three, four, five, six or more teeth.

Those having ordinary skill in the relevant art will appreciate the advantages provide by the features of the present disclosure. For example, it is a feature of the present disclosure to provide a universal double dog gear for use in either left or right side installations. Another feature of the present disclosure to provide a double dog gear with rectangular, wedge shaped teeth. It is further a feature of the present disclosure to provide an automatic pool cover system with a universal double dog gear assembly.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A gear assembly for selectively coupling a drive shaft to one of a first output shaft and a second output shaft, said gear assembly comprising:
   a control gear comprising:
      a body member extending along a longitudinal axis between a first gear face and a second gear face;
      a hollow passageway formed in the body member and extending between the first gear face and the second gear face, the hollow passageway configured and dimensioned to receive the drive shaft;
      a first set of elongated pin slots formed in the body member, the first set of elongated pin slots spiraling on the body member in a first direction;
      a second set of elongated pin slots formed in the body member, the second set of elongated spin slots spiraling on the body member in a second direction, wherein the second direction is different from the first direction;
      a plurality of teeth extending from the first gear face of the body member;
      a plurality of teeth extending from the second gear face of the body member, wherein each the plurality of teeth extending from the first gear face of the body member and each of the plurality of teeth extending from the second gear face of the body member comprises a rectangular cross section; and
   a locking pin configured and dimensioned to engage either of the first set of elongated pin slots and the second set of elongated pin slots.

2. The gear assembly of claim 1, wherein each the plurality of teeth extending from the first gear face of the body member and each of the plurality of teeth extending from the second gear face of the body member comprises a wedge-shaped top surface.

3. The gear assembly of claim 1, further comprising an output gear having comprising a plurality of teeth extending therefrom, wherein the plurality of teeth of the output gear are configured and adapted to intermesh with the plurality of teeth extending from the first gear face of the control gear.

4. The gear assembly of claim 3, wherein the output gear is configured and adapted to couple to the first output shaft.

5. The gear assembly of claim 3, further comprising an additional output gear comprising a plurality of teeth extending therefrom, wherein the plurality of teeth of the additional output gear are configured and adapted to intermesh with the plurality of teeth extending from the second gear face of the control gear.

6. The gear assembly of claim 5, wherein the additional output gear is configured and adapted to couple to the second output shaft.

7. The gear assembly of claim 1, wherein the body member of the control gear is cylindrical.

8. The gear assembly of claim 1, wherein the first set of elongated pin slots form an angle between about 35 degrees and about 45 degrees with an imaginary plane perpendicular the longitudinal axis of the body member.

9. The gear assembly of claim 8, wherein the first set of elongated pin slots form an angle of about 40 degrees with an imaginary plane perpendicular the longitudinal axis of the body member.

10. A gear assembly for selectively coupling a drive shaft to one of a first output shaft and a second output shaft, said gear assembly comprising:
   a control gear comprising:
      a body member extending along a longitudinal axis;
      a hollow passageway formed in the body member, the hollow passageway configured and dimensioned to receive the drive shaft;
   a locking pin;
   a first set of pin slots formed in the body member for receiving the locking pin, the first set of elongated pin slots spiraling on the body member in a first direction; and
   a second set of pin slots formed in the body member for receiving the locking pin, the second set of elongated pin slots spiraling on the body member in a second direction, wherein the second direction is different than the first direction,
wherein the locking pin is configured and dimensioned to mount the control gear onto the drive shaft by engaging one of the first set of pins slots and the second set of pin slots, wherein the first set of pin slots is configured to receive the locking pin and to cause the first output shaft to rotate in a first direction in response to actuation of a motor, and wherein the second set of pin slots is configured to receive the locking pin and cause the first output shaft to rotate in a second direction in response to actuation of the motor, wherein the first and second directions are different.

11. A gear assembly for selectively coupling a drive shaft to one of a first output shaft and a second output shaft, said gear assembly comprising:

a control gear comprising:
  a body member extending along a longitudinal axis;
  a hollow passageway formed in the body member and extending along the longitudinal axis, the hollow passageway configured and dimensioned to receive the drive shaft;
  a first set of elongated pin slots formed in the body member, the first set of elongated pin slots spiraling on the body member in a first direction,
  a second set of elongated pin slots formed in the body member, the second set of elongated pin slots spiraling on the body member in a second direction, the second direction being different that the first direction; and
  a locking pin;
wherein the locking pin is configured and dimensioned to selectively engage one of the first set of elongated pin slots and the second set of elongate pin slots,
wherein the first set of pin slots is configured to cause the control gear to slide in a first axial direction along a length of the drive shaft,
wherein the second set of pin slots is configured to cause the control gear to slide in a second axial direction along the length of the drive shaft, and wherein the first and second axial directions are different.

12. The gear assembly of claim 11, wherein the first set of elongated pin slots form an angle between about 35 degrees and about 45 degrees with an imaginary plane perpendicular the longitudinal axis of the body member.

13. The gear assembly of claim 12, wherein the second set of elongated pin slots form an angle between about 135 degrees and about 145 degrees with an imaginary plane perpendicular the longitudinal axis of the body member.

14. The gear assembly of claim 13, wherein the first set of elongated pin slots form an angle of about 40 degrees with an imaginary plane perpendicular to the longitudinal axis; and wherein the second set of elongated pin slots form an angle of about 140 degrees with the imaginary plane perpendicular to the longitudinal axis, such that the first set of elongated pin slots are approximately a mirror image of the second set of elongated pins across the longitudinal axis of the body member.

15. The gear assembly of claim 11, wherein the body member further comprising:
  a first gear face having a plurality of teeth extending from the first gear face;
  a second gear face having a plurality of teeth extending from the second gear face, wherein each of the teeth of the first plurality of teeth and the second plurality of teeth comprises a wedge-shaped top surface.

16. The gear assembly of claim 15, wherein the plurality of teeth of the first gear face are configured to couple to a first output shaft.

17. The gear assembly of claim 15, wherein the plurality of teeth of the second gear face are configured to couple to a second output shaft.

18. The gear assembly of claim 11, wherein the first set of elongated pin slots are positioned at a first angle, and the second set of elongated pin slots are positioned at a second angle, the first angle and the second angle being different.

* * * * *